(12) United States Patent
Nagasaka

(10) Patent No.: US 10,245,711 B2
(45) Date of Patent: Apr. 2, 2019

(54) ELECTRIC POWER TOOL WITH VIBRATION MECHANISM

(71) Applicant: MAKITA CORPORATION, Anjo-shi, Aichi (JP)

(72) Inventor: Hidenori Nagasaka, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 353 days.

(21) Appl. No.: 15/347,090

(22) Filed: Nov. 9, 2016

(65) Prior Publication Data
US 2017/0157753 A1    Jun. 8, 2017

(30) Foreign Application Priority Data

Dec. 3, 2015  (JP) ................................ 2015-236790

(51) Int. Cl.
| | | |
|---|---|---|
| *B23B 45/00* | (2006.01) | |
| *B25D 16/00* | (2006.01) | |
| *B25F 5/00* | (2006.01) | |
| *B25B 21/02* | (2006.01) | |

(52) U.S. Cl.
CPC ............ *B25B 21/023* (2013.01); *B23B 45/00* (2013.01); *B25D 16/006* (2013.01); *B25F 5/00* (2013.01); *B25F 5/001* (2013.01); *B25D 2211/064* (2013.01); *B25D 2216/0023* (2013.01); *B25D 2216/0038* (2013.01)

(58) Field of Classification Search
CPC ........... B25B 21/023; B25F 5/02; B25F 5/006

USPC ............. 173/47, 48, 93.6, 201, 162.1, 162.2
See application file for complete search history.

(56) References Cited

U.S. PATENT DOCUMENTS

| | | | |
|---|---|---|---|
| 2010/0200257 A1* | 8/2010 | Scrimshaw ......... | B23B 31/1238 173/47 |
| 2012/0031637 A1* | 2/2012 | Yin ......................... | B25B 21/00 173/47 |
| 2012/0037388 A1* | 2/2012 | Yin ......................... | B25B 21/02 173/47 |

FOREIGN PATENT DOCUMENTS

JP        2005-193361 A       7/2005

\* cited by examiner

*Primary Examiner* — Andrew M Tecco
*Assistant Examiner* — Praachi M Pathak
(74) *Attorney, Agent, or Firm* — Oliff PLC

(57) ABSTRACT

An electric power tool includes a housing, a motor, a deceleration mechanism, a final output shaft, a vibration mechanism, a vibration switching member, a stop member, and an expansion prevention portion. The vibration mechanism provides a vibration in an axial direction to the final output shaft. The vibration switching member is accommodated in a slit axially disposed on a front end of a tubular portion and moved back and forth in the slit by an operation from outside to switch on and off actuation of the vibration mechanism. The stop member is installed on the front end of the tubular portion to cover the slit. The expansion prevention portion is disposed on the stop member and is brought in contact with an outer periphery of the front end of the tubular portion to prevent the front end of the tubular portion from expanding,

13 Claims, 8 Drawing Sheets

ELECTRIC POWER TOOL WITH VIBRATION MECHANISM

BACKGROUND

This application claims the benefit of Japanese Patent Application Number 2015-236790 filed on Dec. 3, 2015, the entirety of which is incorporated by reference.

TECHNICAL FIELD

The disclosure relates to an electric power tool with vibration mechanism, such as a vibration driver drill, selectably having a vibration mode for providing vibration in an axial direction to a final output shaft.

RELATED ART

As an electric power tool with vibration mechanism, for example, Japanese Patent Application Publication No. 2005-193361 discloses a vibration driver drill that transmits a torque from a motor to a spindle as a final output shaft via a gear assembly and includes a vibration mechanism configured to select a vibration mode for providing vibration in an axial direction to the spindle. The vibration mechanism includes a gear assembly on which a front gear case is disposed to include two cams externally mounted on the spindle. A first cam is integrally secured to the spindle. A second cam is configured to be rotated as a separate body from the spindle and to be movable in the axial direction, and the second cam is engaged with a vibration switching lever housed in a slit disposed on a front end of the gear case. By moving the vibration switching lever in back and forth by a mode change ring externally mounted on the gear case, the second cam is switched to a position engaging with the first cam and a position not engaging with the first cam. Thus, the vibration mechanism is configured to select the vibration mode.

In the vibration driver drill described above, on the front end of the gear case, a plate-shaped stopper plate for retaining such as the mode change ring is only screwed from the front. Then, in a case where the vibration driver drill is dropped or the like, an impact from the outside is directly transmitted to the gear case, which may result in damages on the gear case such as cracking from the slit part. While it is possible to dispose reinforcing members for preventing damages on the front end of the gear case, the number of components may be increased and thus the cost may be increased. Further, the whole length may be increased in the axial direction, which inhibits downsizing.

Therefore, it is an object of the disclosure to provide an electric power tool with vibration mechanism that ensures effectively preventing damages of the gear case with a simple and compact configuration without employing another member for preventing damages.

SUMMARY

In order to achieve the above-described object, there is provided an electric power tool with vibration mechanism according to a first aspect of the disclosure. The electric power tool may include a housing, a motor, a deceleration mechanism, a final output shaft, a vibration mechanism, a vibration switching member, a stop member, and an expansion prevention portion. The motor may be housed in the housing. The deceleration mechanism to which a rotation of the motor is transmitted may be housed in a gear case. The final output shaft to which the rotation is transmitted from the deceleration mechanism may be held in a tubular portion via a bearing. The tubular portion may be disposed on a front end of the gear case. The final output shaft may project forward. The vibration mechanism may be disposed in the tubular portion and may be configured to provide a vibration in an axial direction to the final output shaft. The vibration switching member may be housed in a slit that is axially disposed on a front end of the tubular portion. The vibration switching member may be moved back and forth in the slit by an operation from outside to switch on and off actuation of the vibration mechanism. The stop member may be installed on the front end of the tubular portion to cover the slit. The expansion prevention portion may be disposed on the stop member. The expansion prevention portion may be brought in contact with an outer periphery of the front end of the tubular portion to prevent the front end of the tubular portion from expanding. The front end of the tubular portion may include the slit.

In the embodiment, preferably, the expansion prevention portion is a ring-shaped protrusion fitting to the front end of the tubular portion from outside.

Preferably, the tubular portion includes an outer periphery of the front end where a stepped portion is disposed, and the protrusion has an inner diameter shape fitting to the stepped portion.

Preferably, the tubular portion externally includes a rotating operation member retained by the stop member formed in a disk-shape.

Preferably, the rotating operation member includes a flat spring for clicking that elastically engages with a plurality of engaging depressed portions disposed on the stop member in accordance with a rotating operation of the rotating operation member, and the flat spring is installed in a retained state by inserting a claw portion formed along a front surface of the rotating operation member between the stop member and the rotating operation member.

Preferably, the engaging depressed portions are disposed on an outer periphery of the stop member.

Preferably, the flat spring is a leaf spring that is fit to a positioning depressed portion disposed on an inner periphery of the rotating operation member to be supported in a tangent line direction of the stop member, and a pair of the claw portions is disposed on both sides of the leaf spring in a longer side direction.

Preferably, the stop member restricts a movement of the bearing to a front side in a state of being installed on the tubular portion.

Preferably, the stop member restricts the movement of the bearing to the front side via an intermediate ring inserted into the tubular portion ahead of the bearing, and the intermediate ring is engaged with the stop member in a state of being restricted to rotate in the tubular portion to also restrict a rotation of the stop member.

Preferably, the intermediate ring includes a regulating protrusion to be inserted into the slit and is restricted to rotate in the tubular portion, and the stop member is brought in contact with the regulating protrusion to press the intermediate ring to the bearing.

Preferably, the rotating operation member is disposed for adjusting a torque of the final output shaft.

Preferably, the vibration mechanism includes a first cam that integrally rotates with the final output shaft disposed, movable back and forth in the axial direction and a second cam rotatably externally mounted on the final output shaft at a rear of the first cant. When the vibration switching member engages with the second cam to restrict the rotation of the second cam, the first cam retreated with the final output shaft engages with the second cam to provide vibration to the final output shaft.

Preferably, the vibration switching member is a vibration switching lever that engages with the second cam on an advance position to restrict the rotation of the second cam and releases the engagement with the second cam on a retracted position to allow the rotation of the second cam.

According to the embodiment disclosed in the disclosure, since the expansion prevention portion is disposed on the stop member installed on the tubular portion, a need for another member for preventing damages is eliminated Therefore, a damage of the gear case is effectively prevented with the simple and compact configuration.

The expansion prevention portion is disposed as the ring-shaped projection fitting to the front end of the tubular portion from outside. Therefore, the expansion of the tubular portion is prevented by the projection without changing the mounting position of the stop member on the tubular portion. Then, disposing of the expansion prevention portion ever inhibits the downsizing.

The claw portion formed parallel to the front surface of the rotating operation member is inserted between the stop member and the rotating operation member to install the flat spring for clicking the rotating operation member in the retained state. Therefore, the downsizing is never inhibited even if the flat spring is disposed.

The engaging depressed portion is disposing on the outer periphery of the stop member. Therefore, the length in the axial direction is reduced in a state where the click sound generating function is maintained.

The stop member is disposed to restrict the movement of the bearing to the front side in a state of being installed on the tubular portion to realize a rational configuration where the stop member also serves for positioning the bearing. Therefore, the assembly of the bearing is facilitated and a need for the retaining member for the bearing is eliminated.

The rotating operation member is disposed for adjusting the torque, so that the click sound is generated in adjusting the torque. Therefore, an excellent usability is provided.

DETAILED DESCRIPTION

Figure 1:
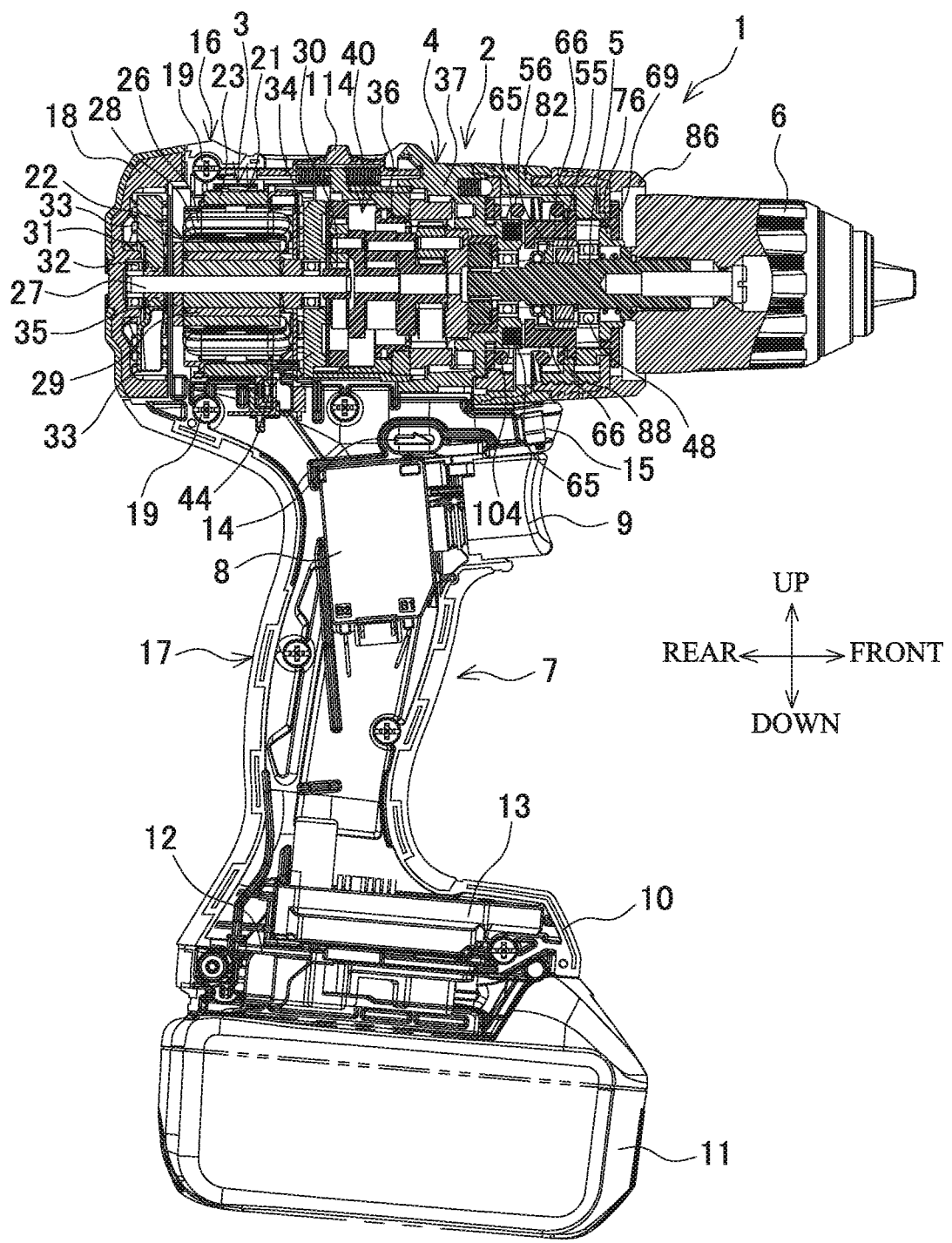
FIG. 1 is a vertical cross-sectional view of a vibration driver drill.
Figure 2:
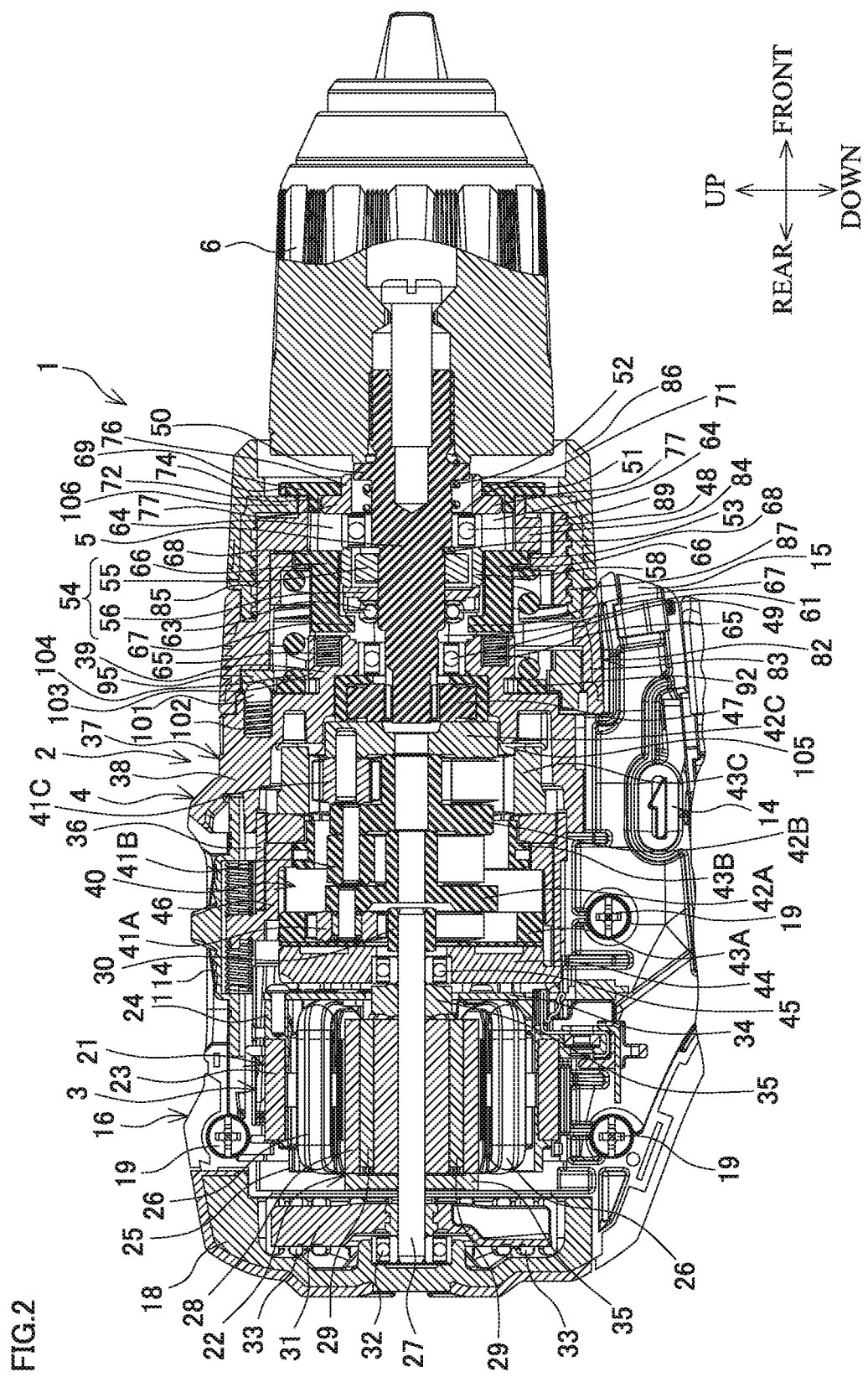
FIG. 2 is an enlarged view of a main body.

The following describes embodiments of the disclosure based on the drawings. FIG. 1 is a vertical cross-sectional view of a vibration driver drill as an exemplary electric power tool with vibration mechanism, and FIG. 2 is an enlarged view of a main body. The vibration driver drill 1 includes a main body 2 extending in a front-rear direction, and the main body 2 houses a brushless motor 3 in the rear. The vibration driver drill 1 transmits a torque from the brushless motor 3 to a spindle 5 as a final output shaft projecting forward from a gear assembly 4, which is assembled ahead of the brushless motor 3, via the gear assembly 4. The vibration driver drill 1 includes a drill chuck 6 configured to grip a bit on a distal end on a front end of the spindle 5.

On a lower side of the main body 2, a handlebar 7 is downwardly disposed. The handlebar 7 internally includes a switch 8 and a battery mounting portion 10. The switch 8 that has a trigger 9 projecting forward is disposed on the upper side. The battery mounting portion 10, to which a battery pack 11 as a power source is installed, is disposed on the lower end. The battery mounting portion 10 internally includes a terminal block 12 electrically coupled to the battery pack 11 and a controller 13 disposed above the terminal block 12. A forward-reverse switching lever 14 is a lever for a motor disposed on the upper side of the switch 8, and an LED 15 is an LED disposed on the upper side of the trigger 9 to irradiate ahead of the drill chuck 6.

Figure 3:
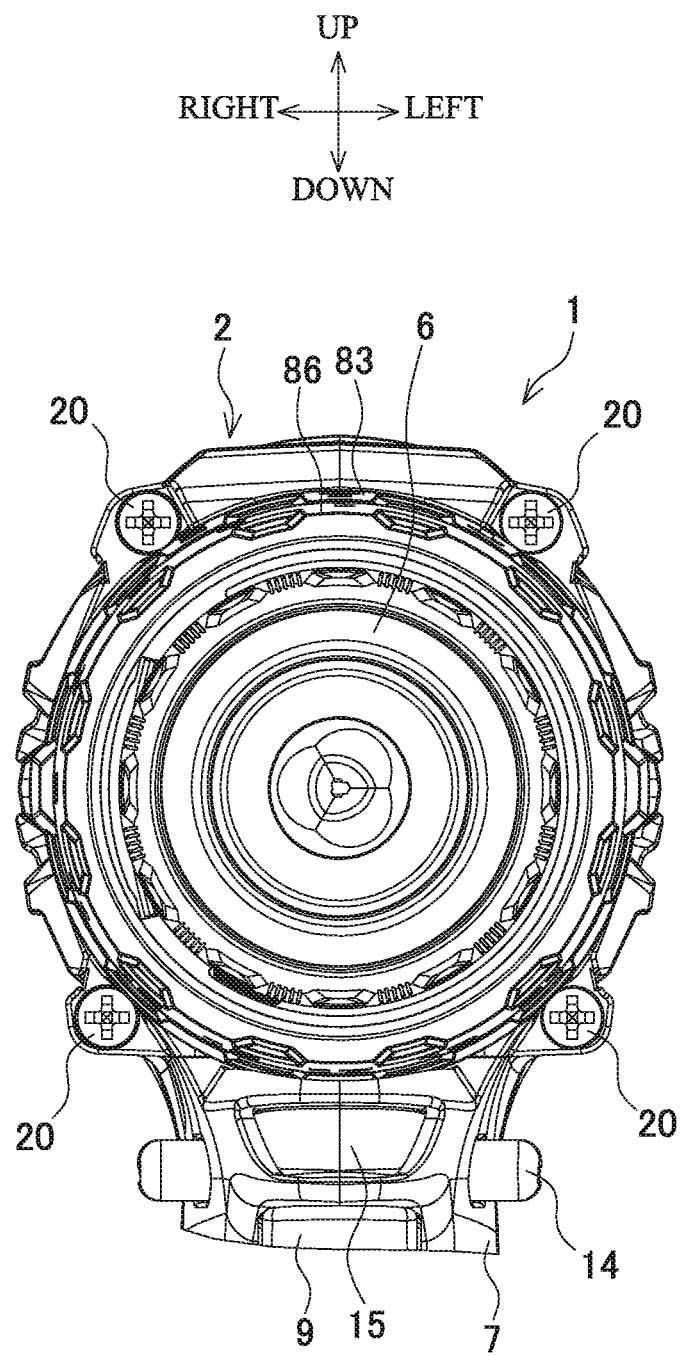
FIG. 3 is a front view of the main body.

The vibration driver drill 1 includes a housing constituted of a cylindrical motor housing 16 that houses the brushless motor 3, a handle housing 17 that forms the handlebar 7 and is integrated with the motor housing 16, and a rear cover 18 that closes the rear of the motor housing 16. The motor housing 16 and the handle housing 17 are formed by assembling a pair of right and left half housings to be integrally formed by screws 19, 19 . . . . As illustrated in FIG. 3, to the front end of the motor housing 16, a second gear case 37 (described later) of the gear assembly 4 is secured from the front by four screws 20, 20 . . . .

The brushless motor 3 is an inner rotor type motor including a cylindrical stator 21 and a rotor 22 passing through the stator 21. The stator 21 includes a stator core 23, a front insulating member 24 and a rear insulating member 25 disposed on the front and the rear of the stator core 23, and a plurality of coils 26, 26 . . . wound around teeth, disposed on the stator core 23, via the front insulating member 24 and the rear insulating member 25.

The rotor 22 includes a rotation shaft 27 lying on a shaft center, a cylindrical rotor core 28 arranged on a peripheral area of the rotation shaft 27, and a plurality of permanent magnets 29, 29 . . . inserted into the rotor core 28. On a front end of the rotation shaft 27, a pinion 30 is installed. On a rear end of the rotation shaft 27, a centrifugal fan 31 is installed, and the rear end of the rotation shaft 27 is supported by a bearing 32 held onto the rear cover 18. The rear cover 18 includes a side surface on which a plurality of exhaust outlets 33, 33 . . . are disposed. Ahead of the exhaust outlets 33, 33 . . . , the motor housing 16 includes a side surface on which an air intake opening (not illustrated) is disposed. A sensor circuit board 34 is a sensor circuit board installed on a front end of the front insulating member 24, and includes three rotation detecting elements that detect the position of the permanent magnet 29 to output a rotation detection signal. To the front and the rear of the rotor core 28 on the rotation shaft 27, balance plates 35, 35 for balancing are fixedly secured.

Figure 4:
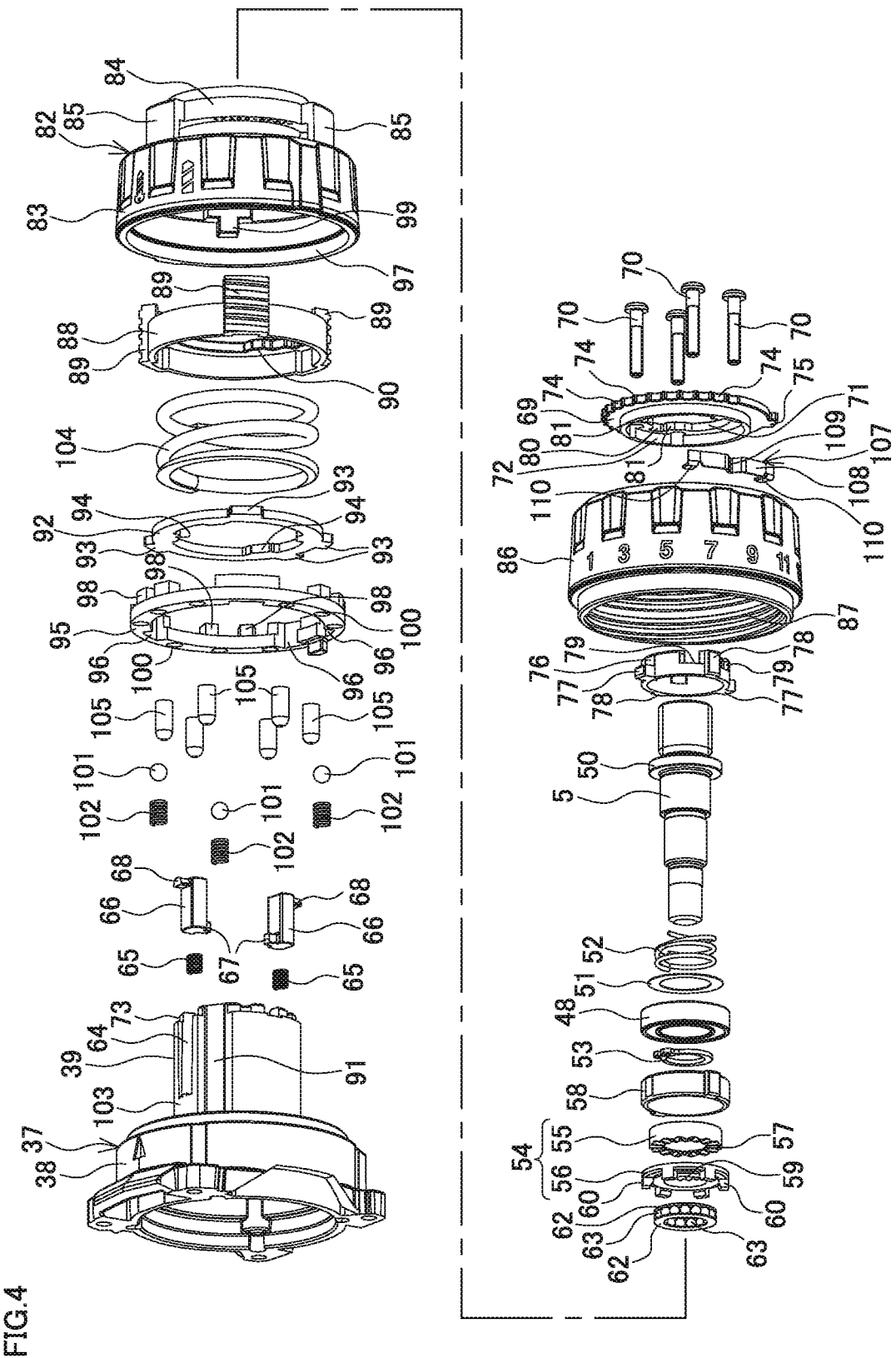
FIG. 4 is an exploded perspective view of a second gear case part in a gear assembly.

The gear assembly 4 includes a first gear case 36 and the second gear case 37. The second gear case 37 is assembled ahead of the first gear case 36, and as illustrated in FIG. 4, has a two-stage cylindrical shape constituted of a large diameter portion 38 and a small diameter portion 39 as a tubular portion. The first gear case 36 and the large diameter portion 38 internally houses a deceleration mechanism 40 where a plurality of planetary gears 41A to 41C, carriers 42A to 42C supporting the planetary gears 41A to 41C, and internal gears 43A to 43C engaging with the planetary gears 41A to 41C on the outer periphery of the planetary gears 41A to 41C are disposed in three stages. The first gear case 36 includes a rear end closed by a cap 44 where a bearing 45 for pivotally supporting the rotation shaft 27 is disposed. In a state where the gear assembly 4 is assembled, the pinion 30 of the rotation shaft 27 projects into the first gear case 36 to engage with the planetary gear 41A in the first stage.

Here, the internal gear 43B in the second stage is movable in back and forth between an advance position and a retracted position. The advance position is a position where the internal gear 43B in the second stage engages with the planetary gear 41B in the second stage so that the rotation of the internal gear 43B is restricted in the first gear case 36. The retracted position is a position where the internal gear 43B in the second stage simultaneously engages with the planetary gear 41B in the second stage and the carrier 42A in the first stage so that the internal gear 43B freely rotates. The internal gear 43B in the second stage is coupled to an operating button 114, disposed on a top surface of the motor housing 16, via a linking member 46 that engages with the outer periphery of the internal gear 43B to project to the upper side of the first gear case 36. Accordingly, when the internal gear 43B is moved to the advance position with a sliding operation of the operating button 114, a low speed mode where a deceleration in the second stage acts is provided, and when the internal gear 43B is moved to the retracted position, a high speed mode where the carrier 42A in the first stage integrally rotates with the planetary gear 41B and the carrier 42B in the second stage to cancel the deceleration in the second stage is provided.

The spindle 5 includes a rear end spline-coupled to a lock cam 47 integrated with the carrier 42C in the third stage. The spindle 5 is held by front and rear bearings 48, 49 in the small diameter portion 39 of the second gear case 37 such that the spindle 5 is movable in back and forth in the axial direction and rotatable. However, the spindle 5 is biased to the advance position where a clip 53 disposed on the rear of the bearing 48 is in contact with the bearing 48 in the normal state by a coil spring 52 externally mounted between a flange 50 disposed closer to the front of the spindle 5 and a washer 51 in contact with a front face of the front bearing 48.

Between the bearings 48 and 49 on the spindle 5, a first cam 55 and a second cam 56 in a ring shape are coaxially externally mounted from the front to form a vibration mechanism 54 as illustrated in FIG. 4. The first cam 55 includes a rear surface on which a first cam surface 57 constituted of a plurality of cam teeth is disposed. The first cam 55 is fixedly secured integrated with the spindle 5 in a spacer 58 held in the small diameter portion 39 at the rear of the bearing 48. The second cam 56 includes a front surface on which a second cam surface 59 constituted of a plurality of cam teeth is disposed, and a rear surface on which a plurality of stops 60, 60 . . . arranged at regular intervals in a circumferential direction are disposed. The spindle 5 is movably inserted into the second cam 56 so that the second cam 56 is rotatable. On the other hand, the movement of the second cam 56 in back and forth is restricted between the spacer 58 and a pair of washers 62, 62 that are restricted by a stopper portion 61 disposed to protrude on an inner periphery of the small diameter portion 39 and hold a plurality of steel balls 63, 63 . . . .

Furthermore, the small diameter portion 39 includes a pair of slits 64, 64 in the point symmetry from the front end along the axial direction. The respective slits 64 accommodate a coil spring 65 and a vibration switching lever 66 as a vibration switching member. The respective vibration switching levers 66 are biased forward by the coil spring 65 while being movable in back and forth in the slit 64. On the inner surface side of the rear end of the respective vibration switching levers 66, an inside protrusion 67 is disposed to protrude projecting to the inner peripheral side of the small diameter portion 39, and is engageable with the stop 60 of the second cam 56 on an advance position (described later) of the vibration switching lever 66. On the outer surface side of the front end of the respective vibration switching levers 66, an outside protrusion 68 is disposed to protrude projecting to the outer peripheral side of the small diameter portion 39.

The small diameter portion 39 includes a front end to which a retainer 69 as a stop member is orthogonally secured from the front by four screws 70, 70 . . . . The retainer 69 is disk-shaped with a large diameter compared with the small diameter portion 39 and includes a fitting hole 71 for an intermediate ring 76 (described later) on the center. The retainer 69 includes a rear surface on which a ring-shaped projection 72 as an expansion prevention portion is disposed to protrude. The projection 72 has an inner diameter shape to be fit to a stepped portion 73 disposed on the outer periphery of the front end of the small diameter portion 39. In a state where the projection 72 is fitted onto the front end of the small diameter portion 39, the retainer 69 is restricted to move to the rear by the stepped portion 73, and also restricted to rotate by the fitting of the projection 72. On the outer periphery of the retainer 69, a plurality of engaging depressed portions 74, 74 . . . are partially continuously formed, and on the part where the engaging depressed portions 74 are not formed, a protrusion 75 is disposed, The intermediate ring 76 is a short cylindrical intermediate ring inserted into the front end of the small diameter portion 39 inside the retainer 69. On the rear part of the outer surface of the intermediate ring 76, a pair of regulating protrusions 77, 77 inserted into the slits 64, 64 of the small diameter portion 39 and a pair of fitting protrusions 78, 78 are disposed. The pair of fitting protrusions 78, 78 are disposed on a phase different from the regulating protrusions 77, 77 and longer than the regulating protrusion 77 in back and forth. On both sides of the respective fitting protrusions 78, cutouts 79, 79 are disposed.

Figure 5:
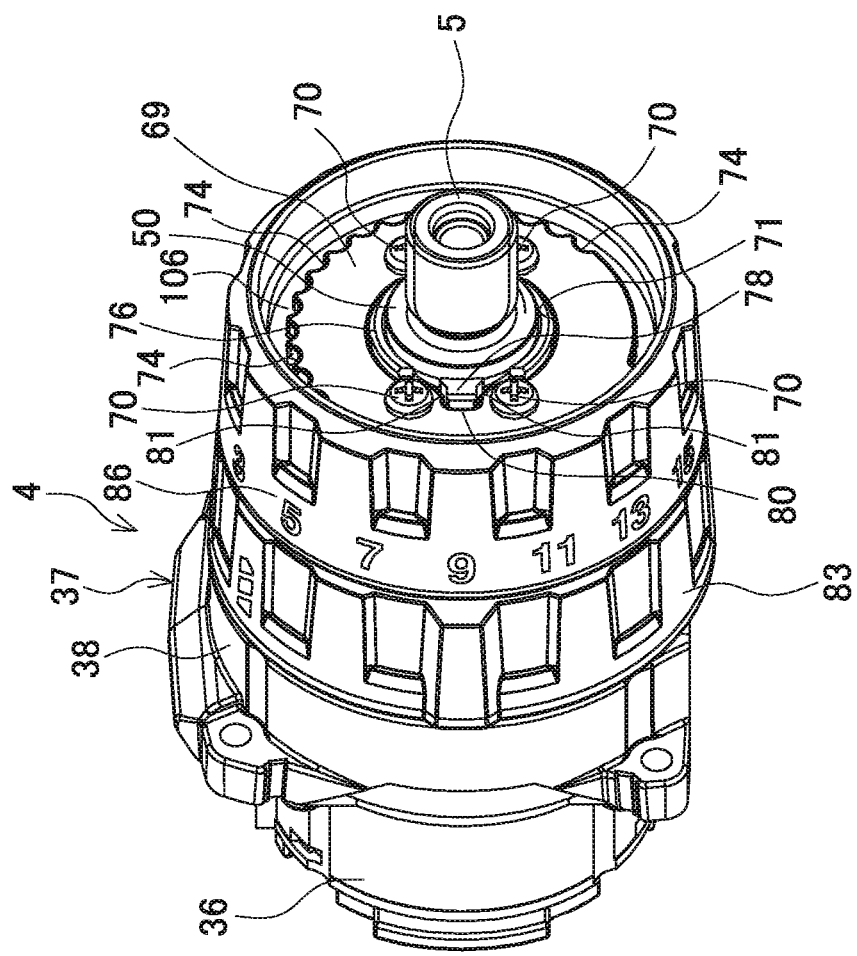
FIG. 5 is a perspective view of the gear assembly.
Figure 6:
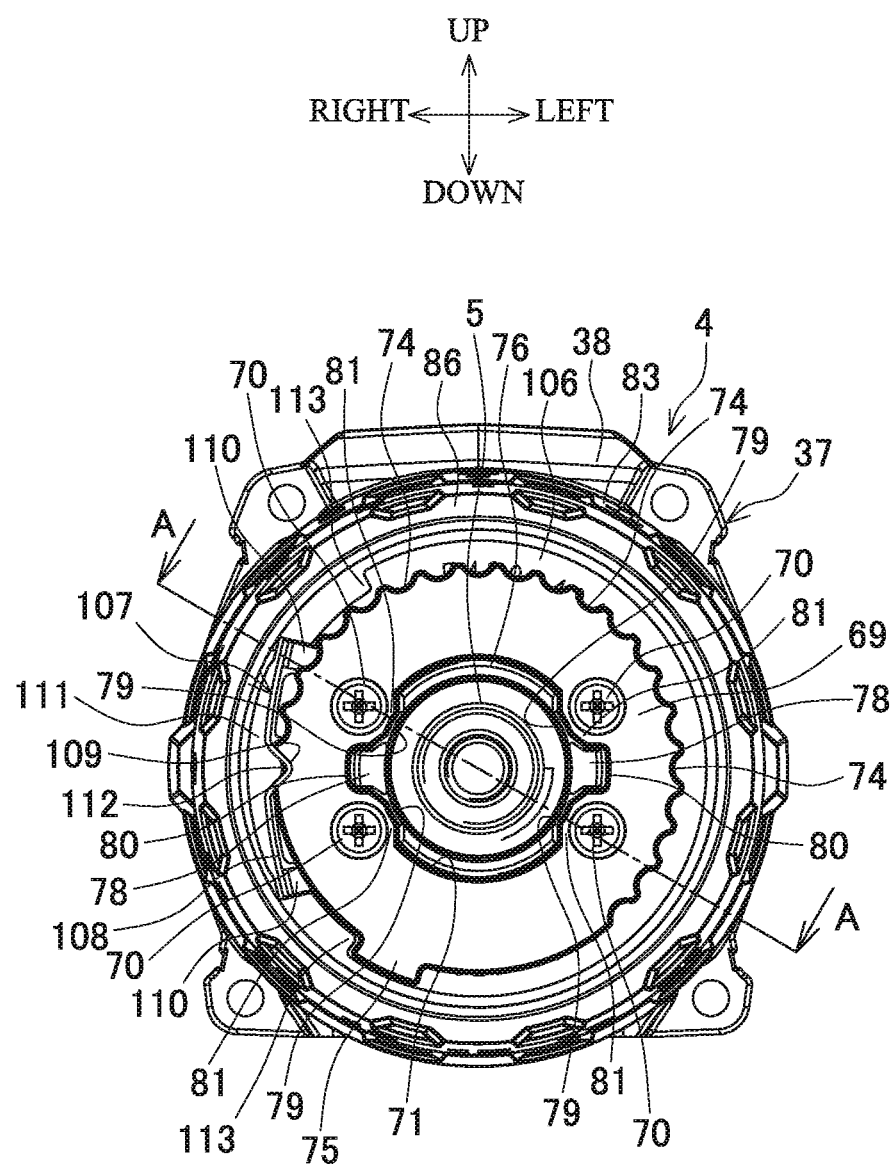
FIG. 6 is a front view of the gear assembly.

When the regulating protrusions 77, 77 disposed on the rear side are adjusted to the slits 64, 64 and inserted into the front end of the small diameter portion 39, the intermediate ring 76 is restricted to retreat on a position in contact with the bearing 48. In this state, the retainer 69 is assembled. The intermediate ring 76 is fit to the fitting hole 71 and projects forward as illustrated in FIGS. 5 and 6. Then, the retainer 69 is brought in contact with the regulating protrusions 77, 77. Accordingly, the bearing 48 is pushed rearward by the retainer 69 via the intermediate ring 76 so as to he retained. The fitting hole 71 is formed to include fitting depressed portions 80, 80 to which the fitting protrusions 78, 78 of the intermediate ring 76 fit, and to include projecting portions 81, 81 that engage with the cutouts 79, 79. Therefore, the retainer 69 is restricted to rotate also by the intermediate ring 76 whose rotation is restricted in the small diameter portion 39.

On the other hand, the small diameter portion 39 externally includes a mode change ring 82 rotatably between the large diameter portion 38 and the retainer 69. The mode change ring 82 is constituted of an operation ring 83 with an approximately identical diameter to the motor housing 16, a cam ring 84 positioned ahead of the operation ring 83 with a small diameter compared with the operation ring 83, and three coupling plates 85, 85 . . . axially disposed to extend from an outer periphery of the cam ring 84 and disposed at regular intervals in the circumferential direction to couple both rings 83, 84. The outside protrusions 68, 68 of the vibration switching levers 66, 66 are brought in contact with the back end edge of the cam ring 84 of the mode change ring 82. Then, the forward movement of the vibration switching levers 66, 66, which are biased forward by the coil springs 65, 65, can be restricted. The cam ring 84 includes the back end edge on which a pair of cam depressed portions (not illustrated) is disposed to be depressed on the point symmetry position. On a rotation position of the mode change ring 82 where the cam depressed portions are positioned ahead of the outside protrusions 68, 68, the vibration switching levers 66, 66 move to the advance position to engage the inside protrusions 67, 67 with the stops 60, 60 of the second earn 56. On a rotation position of the mode change ring 82 where the cam depressed portions are not positioned ahead of the outside protrusions 68, 68, the vibration switching levers 66, 66 move to the retracted position to remove the inside protrusions 67, 67 from the stops 60, 60 of the second cam 56.

A change ring 86 is a cylindrical change ring as a rotating operation member rotatably externally mounted on the small diameter portion 39 between the front of the operation ring 83 and the retainer 69. The change ring 86 includes a female threaded portion 87 on the inner periphery. The small diameter portion 39 externally includes a spring holder 88 movable in the axial direction in a state where protrusions 90, 90, which are disposed on the inner diameter of the spring holder 88, are engaged with grooves 91, 91 disposed on the outer periphery of the small diameter portion 39 in the axial direction. The spring holder 88 includes male thread plates 89, 89 ... projecting from between the coupling plates 85, 85 ... of the mode change ring 82. The male thread plates 89 are screwed with the female threaded portion 87 of the change ring 86. Accordingly, when the rotating operation of the change ring 86 is performed, the spring holder 88, whose rotation is restricted, is screwed and fed in the axial direction, On the other hand, the small diameter portion 39 includes a base on which a flat washer 92 is externally mounted. The flat washer 92 includes an outer peripheral edge on which a plurality of outer protrusions 93, 93 . . . are disposed to protrude in the circumferential direction, and an inner peripheral edge on which a plurality of inner protrusions 94, 94 ... are disposed to protrude. The flat washer 92 externally includes a coupling ring 95. The coupling ring 95 includes depressed grooves 96, 96 ... on the inner periphery, and the outer protrusions 93 of the flat washer 92 are fit to the depressed grooves 96. The coupling ring 95 is integrally rotatable with the flat washer 92 in a state where the flat washer 92 is allowed to move back and forth. The coupling ring 95 is fit to a ring-shaped stepped portion 97 formed on an inner periphery of the rear end of the operation ring 83, and causes locking claws 98, 98 disposed to protrude forward to be locked to locking projections 99, 99 disposed to protrude on the inner periphery of the operation ring 83. Thus, the coupling ring 95 is integrally rotatably coupled to the operation ring 83 with the flat washer 92. The coupling ring 95 includes a rear surface on which a plurality of circular depressed portions 100, 100 . . . are disposed. The large diameter portion 38 includes three balls 101, 101 ... on a concentric circle of the circular depressed portions 100 in a state of being biased forward by a coil spring 102, and the balls 101, 101 . . . are in contact with the rear surface of the coupling ring 95.

On the outer periphery of the small diameter portion 39, protrusions 103, 103 . . . are disposed to protrude along the axial direction on the front side of a position apart from the front surface of the large diameter portion 38 by approximately a thickness of the flat washer 92. The protrusions 103, 103 . . . match the inner periphery shape of the flat washer 92, and overlap the inner protrusions 94, 94 in the axial direction on positions excepting the matching positions. Accordingly, the flat washer 92 is rotatable on the base of the small diameter portion 39 where the protrusions 103 are not disposed, and allowed to move to ahead of the base only on the matching positions where the inner protrusions 94 do not interfere with the protrusions 103 in the axial direction.

The small diameter portion 39 externally includes a coil spring 104 between the flat washer 92 and the spring holder 88 to press the flat washer 92 to the large diameter portion 38 side. The large diameter portion 38 internally includes six pressing pins 105, 105 . . . held at regular intervals in the circumferential direction on the rear of the flat washer 92. The six pressing pins 105, 105 . . . are circumferentially engageable with clutch cams snot illustrated) that are in contact with the front surface of the rotatably disposed internal gear 43C on the third stage of the deceleration mechanism 40 and circumferentially disposed to protrude at regular intervals on the front surface of the internal gear 43C.

Thus, since the biasing force of the coil spring 104 is directly transmitted to the internal gear 43C via the pressing pin 105 and the flat washer 92, the rotation of the internal gear 43C is restricted by the biasing force of the coil spring 104. When the length of the coil spring 104 is changed in the axial direction by the screw feeding of the spring holder 88 in accordance with the rotating operation of the change ring 86, the biasing force to the internal gear 43C is changed. The change ring 86 includes an inner flange 106 on the inner periphery in the middle portion, and the inner flange 106 is disposed on the rear of the retainer 69 and the front end outside of the cam ring 84. On the front surface of the inner flange 106 and outside the retainer 69, a leaf spring 107 as a flat spring is disposed. The leaf spring 107 is configured to integrally rotate in accordance with the rotation of the change ring 86 and to be engaged with the engaging depressed portion 74 of the retainer 69 to cause a click action.

Figure 7:
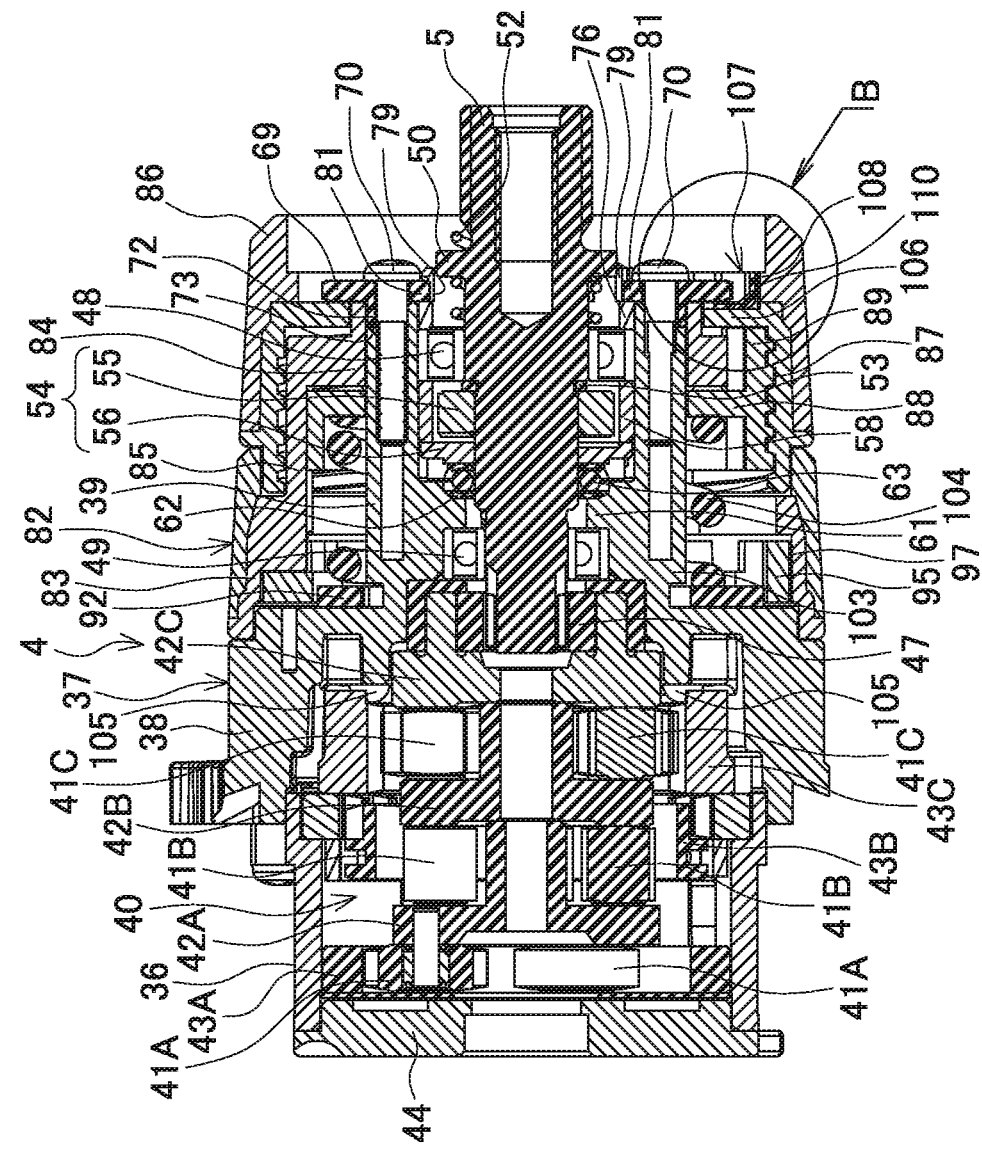
FIG. 7 is a cross-sectional view taken along the line A-A of FIG. 6.
Figure 8:
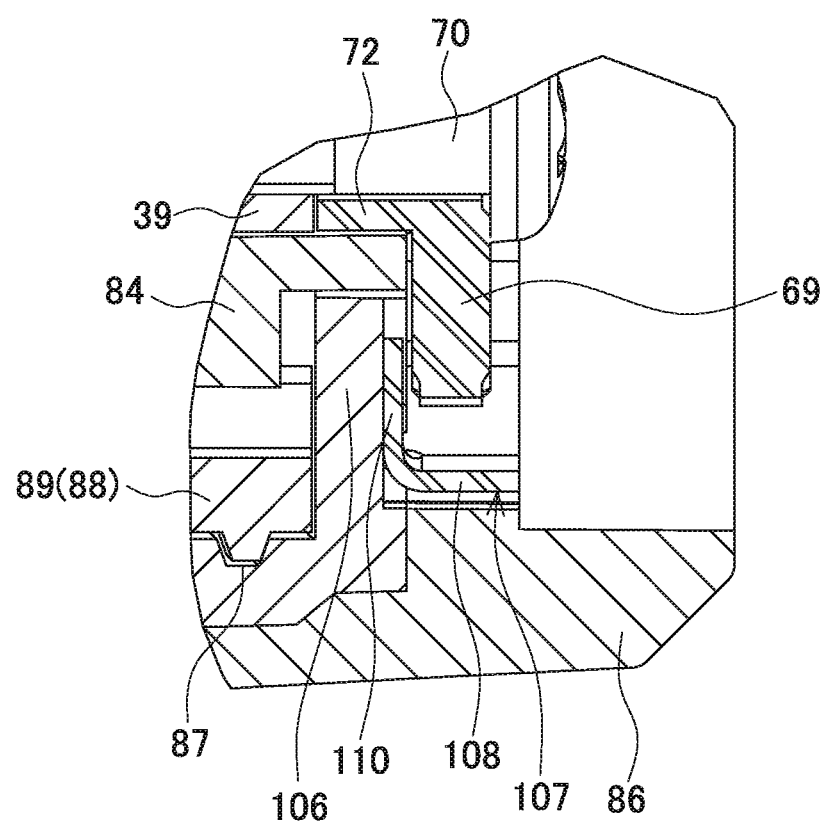
FIG. 8 is an enlarged view of B part of FIG. 7.

As illustrated in FIG. 6, the leaf spring 107 includes a mountain-shaped portion 109 projecting to the retainer 69 side on the center of a strip-shaped spring body 108. On both sides of the spring body 108 in the longer side direction, a pair of claw portions 110, 110, which are bent to the retainer 69 side orthogonally to the spring body 108, are provided. The inner flange 106 includes a front surface on which a regulating stepped portion 111 is disposed to protrude along the inner periphery of the change ring 86. The spring body 108 disposed upright from the front surface of the inner flange 106 is fit to a positioning depressed portion 112 formed by notching the regulating stepped portion 111 in the identical shape to the leaf spring 107, so that the leaf spring 107 is supported in a direction of a tangent line with the retainer 69. In the above configuration, as illustrated in FIGS. 7 and 8, the claw portions 110, 110 enter between the retainer 69 and the inner flange 106 facing parallel to the front surface of the inner flange 106 and therefore the leaf spring 107 is prevented from falling out forward. On both sides of the regulating stepped portion 111 in the circumferential direction, stoppers 113, 113 brought in contact with the protrusion 75 disposed to protrude on the retainer 69 in accordance with the rotation of the change ring 86 are disposed to restrict the rotation of the change ring 86 within a range of engaging of the mountain-shaped portion 109 with the engaging depressed portion 74.

According to the vibration driver drill 1 configured as described above, the rotation position of the mode change ring 82, the back and forth movement of the vibration switching lever 66 and the rotation of the flat washer 92 in accordance with the rotation position of the mode change ring 82 provide selectable three action modes as described below. First, on a first rotation position of the mode change ring 82 as a position where the inner protrusion 94 of the flat washer 92 axially interferes with the protrusion 103 of the small diameter portion 39, since the cam depressed portions of the cam ring 84 are positioned on positions apart from the front side of the vibration switching lever 66, the vibration switching levers 66, 66 are positioned on the retracted position as illustrated in FIGS. 1 and 2, and the inside protrusion 67 does not engage with the second cam 56. Then, the action mode is a drill mode where the second cam 56 is in a freely rotatable state and the flat washer 92 is restricted to move forward by the protrusion 103.

In the drill mode, when the brushless motor 3 is driven to rotate the spindle 5, a fixed state of the internal gear 43C is not changed and the rotation of the spindle 5 continues because the pressing pins 105 restricted to move forward by the flat washer 92 do not exceed the clutch cant of the internal gear 43C regardless of a load to the spindle 5. If such as a drill bit is pressed to a workpiece and the spindle 5 is retreated, the first cam surface 57 of the first cam 55 engages with the second cam surface 59 of the second cam 56. However, since the second cam 56 is in the freely rotatable state, the second cam 56 rotates with the first cam 55 without causing vibration on the spindle 5.

Next, on a second rotation position where the mode change ring 82 is rotated from the drill mode to a left side viewing from the front by a predetermined angle, the flat washer 92 rotates to move the inner protrusion 94 from the rear of the protrusion 103 of the small diameter portion 39 while the cam depressed portion of the cam ring 84 has not come to the front of the vibration switching lever 66 and the vibration switching lever 66 stays on the retracted position. Then, the action mode is a clutch mode where the flat washer 92 is allowed to move forward.

In a case where the spindle 5 is rotated to screw in the clutch mode, when the load to the spindle 5 exceeds the pressing force of the coil spring 104 fixing the internal gear 43C, the clutch cam of the internal gear 43C extrudes the pressing pin 105 and the flat washer 92 forward to idle the internal gear 43C and the screwing is terminated (clutch actuation). Even in this case, since the second cam 56 remains to be in the freely rotatable state, the vibration does not occur on the spindle 5.

Then, on a third rotation position where the mode change ring 82 is further rotated from the clutch mode to the left side by the predetermined angle, the cam depressed portion of the cam ring 84 is positioned ahead of the vibration switching lever 66. Then, the vibration switching lever 66 is allowed to move forward to engage the inside protrusion 67 with the stop 60 of the second cam 56. On the other hand, the inner protrusion 94 of the flat washer 92 again moves to the rear of the protrusion 103 of the small diameter portion 39. Then, the action mode is a vibration mode where the rotation of the second cam 56 is restricted.

In a case where the spindle 5 is rotated in the vibration mode, when the spindle 5 is retreated, since the first cam surface 57 of the first cam 55 integrally rotated with the spindle 5 engages with the second cam surface 59 of the second cam 56 whose rotation is restricted by the vibration switching lever 66, the vibration occurs on the spindle 5 in the axial direction. Since the flat washer 92 remains to be in the fixed state by the protrusion 103, the spindle 5 continues to rotate regardless of the load to the spindle 5.

On the other hand, even in a case where the vibration driver drill 1 is dropped or the like to have an impact the small diameter portion 39 of the second gear case 37 from outside, since the retainer 69 is coupled to the front end in a state where the projection 72 is fitted onto the stepped portion 73. Therefore, the expansion of the front end of the small diameter portion 39 is reduced even if the slit 64 is disposed. Then, the damage such as the occurrence of cracks on the positions of the slits 64, 64 is less likely to occur. Especially, since the projection 72 is disposed on the retainer 69, the need for disposing extra members for preventing damages is eliminated. As a result, the number of components and the increase in cost are suppressed. The main body 2 is prevented from increasing the whole length.

Thus, with the vibration driver drill 1 according to the above-described embodiment, the retainer 69 includes an expansion prevention portion (the projection 72) that is brought in contact with the outer periphery of the front end of the small diameter portion 39 where the slits 64, 64 are disposed to prevent the front end of the small diameter portion 39 from expanding. As a result, a need for another member for preventing damages is eliminated so that the damage of the second gear case 37 is effectively prevented with the simple and compact configuration.

Especially, in the vibration driver drill 1, the expansion prevention portion is disposed as the ring-shaped projection 72 fitting to the front end of the small diameter portion 39 from outside. In the above configuration, the expansion of the small diameter portion 39 is prevented by the projection 72 without changing the mounting position of the retainer 69 to the small diameter portion 39. Then, disposing of the expansion prevention portion never inhibits the downsizing of the main body 2.

The claw portion 110 formed parallel to the front surface of the change ring 86 is inserted between the retainer 69 and the change ring 86 to install the leaf spring 107 for clicking the change ring 86 in the retained state. Then, disposing of the leaf spring 107 never inhibits the downsizing of the main body 2.

Furthermore, since the engaging depressed portion 74 is disposed on the outer periphery of the retainer 69, the length of the main body 2 in the axial direction is reduced in a state where a click sound generating function is maintained, Then, the retainer 69 restricts the bearing 48 to move forward via the intermediate ring 76 in a state of being installed on the small diameter portion 39. Therefore, a rational configuration where the retainer 69 also serves for positioning the bearing 48 is realized to facilitate the assembly of the bearing 48 and eliminate the need for a retaining member for the bearing 48.

In addition, the change ring 86 for adjusting the torque of the spindle 5 is disposed and therefore the click sound is generated in adjusting the torque to provide an excellent usability.

As the expansion prevention portion, not limiting to the ring-shaped protrusion, a rib intermittently disposed upright on the retainer in concentric so as to be partially in contact with only the outer peripheral side of the slit may be employed. Other than disposing the protrusion or the rib, a ring-shaped groove to which the front end of the small diameter portion fits may be disposed on the back surface of the retainer as the expansion prevention portion.

Furthermore, while the above embodiment employs the configuration where the retainer indirectly restricts the movement of the front bearing via the intermediate ring, the intermediate ring can be integrally disposed with the retainer to directly restrict the movement of the bearing.

Further, as the motor, not limiting to the inner rotor type brushless motor, an outer rotor type brushless motor can be employed, and the disclosure can employ not the brushless motor hut even a commutator motor without hindrance. Not limiting to the vibration driver drill, the disclosure is applicable to other models of such as a vibration drill insofar as a model with a vibration switching member to switch on and off actuation of a vibration mechanism. Needless to say, there is no problem to employ not a DC tool but an AC tool. Furthermore, not limiting to the vibration driver drill, the disclosure according to the flat spring is applicable to other tools such as a driver drill, a screw driver, a hammer drill, a circular saw, a jigsaw, a sander, and the like insofar as including a configuration where a rotating operation member is used to provide a click action.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool with vibration mechanism comprising:
   a housing;
   a motor housed in the housing;
   a deceleration mechanism to which a rotation of the motor is transmitted, the deceleration mechanism being housed in a gear case;
   a final output shaft to which the rotation is transmitted from the deceleration mechanism, the final output shaft being held in a tubular portion via a bearing, the tubular portion being disposed on a front end of the gear case, and the final output shaft projecting forward;
   a vibration mechanism disposed in the tubular portion, the vibration mechanism being configured to provide a vibration in an axial direction to the final output shaft;
   a vibration switching member housed in a slit, the slit being axially disposed on a front end of the tubular portion, the vibration switching member being moved back and forth in the slit by an operation from outside to switch on and off actuation of the vibration mechanism;
   a stop member installed on the front end of the tubular portion to cover the slit; and
   an expansion prevention portion disposed on the stop member, the expansion prevention portion being brought in contact with an outer periphery of the front end of the tubular portion to prevent the front end of the tubular portion from expanding, and the front end of the tubular portion including the slit.

2. The electric power tool with vibration mechanism according to claim 1, wherein
   the expansion prevention portion is a ring-shaped protrusion being fit to the front end of the tubular portion from outside.

3. The electric power tool with vibration mechanism according to claim 2, wherein:
   the tubular portion includes an outer periphery of the front end where a stepped portion is disposed, and the protrusion has an inner diameter shape being fit to the stepped portion.

4. The electric power tool with vibration mechanism according to claim 1, wherein
   the tubular portion externally includes a rotating operation member retained by the stop member formed in a disk-shape.

5. The electric power tool with vibration mechanism according to claim 4, wherein:
   the rotating operation member includes a flat spring for clicking that elastically engages with a plurality of engaging depressed portions disposed on the stop member in accordance with a rotating operation of the rotating operation member, and
   the flat spring is installed in a retained state by inserting a claw portion formed along a front surface of the rotating operation member between the stop member and the rotating operation member.

6. The electric power tool with vibration mechanism according to claim 5, wherein
   the engaging depressed portion is disposed on an outer periphery of the stop member.

7. The electric power tool with vibration mechanism according to claim 6, wherein:
   the flat spring is a leaf spring that is fit to a positioning depressed portion disposed on an inner periphery of the rotating operation member to be supported in a tangent line direction of the stop member, and
   a pair of the claw portions is disposed on both sides of the leaf spring in a longer side direction.

8. The electric power tool with vibration mechanism according to claim 4, wherein
   the rotating operation member is disposed for adjusting a torque of the final output shaft.

9. The electric power tool with vibration mechanism according to claim 1, wherein
   the stop member restricts a movement of the bearing to a front side in a state of being installed on the tubular portion.

10. The electric power tool with vibration mechanism according to claim 9, wherein:
    the stop member restricts the movement of the bearing to the front side via an intermediate ring inserted into the tubular portion ahead of the bearing, and
    the intermediate ring is engaged with the stop member in a state of being restricted to rotate in the tubular portion to also restrict a rotation of the stop member.

11. The electric power tool with vibration mechanism according to claim 10, wherein:
    the intermediate ring includes a regulating protrusion to be inserted into the slit and is restricted to rotate in the tubular portion, and
    the stop member is brought in contact with the regulating protrusion to press the intermediate ring to the bearing.

12. The electric power tool with vibration mechanism according to claim 1, wherein:
    the vibration mechanism includes a first cam that integrally rotates with the final output shaft disposed movable back and forth in the axial direction and a second cam rotatably externally mounted on the final output shaft at a rear of the first cam, and
    when the vibration switching member engages with the second cam to restrict the rotation of the second cam, the first cam retreated with the final output shaft engages with the second cam to provide the vibration to the final output shaft.

13. The electric power tool with vibration mechanism according to claim 12, wherein the vibration switching member is a vibration switching lever that engages with the second cam on an advance position to restrict the rotation of the second cam and releases the engagement with the second cam on a retracted position to allow the rotation of the second cam.

\* \* \* \* \*